US007583878B2

(12) United States Patent
Sugizaki et al.

(10) Patent No.: US 7,583,878 B2
(45) Date of Patent: Sep. 1, 2009

(54) OPTICAL FIBER, OPTICAL FIBER RIBBON, AND OPTICAL INTERCONNECTION SYSTEM

(75) Inventors: Ryuichi Sugizaki, Tokyo (JP); Iwao Shimotakahara, Tokyo (JP); Harumi Inaba, Tokyo (JP); Takeshi Yagi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/192,169

(22) Filed: Aug. 15, 2008

(65) Prior Publication Data

US 2008/0310805 A1 Dec. 18, 2008

Related U.S. Application Data

(63) Continuation of application No. PCT/JP2007/067056, filed on Aug. 31, 2007.

(30) Foreign Application Priority Data

Aug. 31, 2006 (JP) .............................. 2006-236203

(51) Int. Cl.
G02B 6/02 (2006.01)
G02B 6/16 (2006.01)
G02B 6/00 (2006.01)

(52) U.S. Cl. .................. 385/126; 385/123; 385/124; 385/127; 385/128; 385/141; 385/144

(58) Field of Classification Search .................. 385/126
See application file for complete search history.

(56) References Cited

U.S. PATENT DOCUMENTS

| | | | | |
|---|---|---|---|---|
| 7,046,885 B2* | 5/2006 | Sugizaki et al. | ............ | 385/123 |
| 7,099,545 B2* | 8/2006 | Sako et al. | ............ | 385/123 |
| 7,116,872 B2* | 10/2006 | Okuno et al. | ............ | 385/114 |
| 7,126,748 B2* | 10/2006 | Sugizaki et al. | ............ | 359/334 |
| 7,295,741 B2* | 11/2007 | Sako et al. | ............ | 385/127 |
| 7,366,386 B2* | 4/2008 | Sako et al. | ............ | 385/123 |
| 7,440,167 B2* | 10/2008 | Taniguchi et al. | ............ | 359/334 |
| 2006/0034575 A1* | 2/2006 | Sako et al. | ............ | 385/127 |

(Continued)

FOREIGN PATENT DOCUMENTS

JP 01-295207 A 11/1989

(Continued)

OTHER PUBLICATIONS

U.S. Appl. No. 11/909,162, filed Sep. 20, 2007, Sako et al.

(Continued)

*Primary Examiner*—Frank G Font
*Assistant Examiner*—Ryan Lepisto
(74) *Attorney, Agent, or Firm*—Oblon, Spivak, McClelland, Maier & Neustadt, P.C.

(57) ABSTRACT

An optical fiber is made of silica-based glass, and includes a core and a cladding. The optical fiber has a mode field diameter of 5.4 micrometers or larger at a wavelength of 1300 nanometers, transmits light with a wavelength of 1250 nanometers in a single mode, and has a bending loss of 1 dB/turn or smaller at a wavelength of 1300 nanometers when the optical fiber is bent with a curvature radius of 1 millimeter.

18 Claims, 5 Drawing Sheets

U.S. PATENT DOCUMENTS

| | | | |
|---|---|---|---|
| 2006/0093297 A1* | 5/2006 | Sako et al. ............. | 385/126 |
| 2006/0198589 A1* | 9/2006 | Sako et al. ............. | 385/123 |
| 2007/0147756 A1 | 6/2007 | Matsuo et al. | |
| 2008/0226241 A1 | 9/2008 | Sugizaki et al. | |

FOREIGN PATENT DOCUMENTS

| | | |
|---|---|---|
| JP | 01-300207 A | 12/1989 |
| JP | 2001-278641 A | 10/2001 |
| JP | 2006-126414 A | 5/2006 |
| WO | WO 2006/025231 A1 | 3/2006 |

OTHER PUBLICATIONS

U.S. Appl. No. 12/180,788, filed Jul. 28, 2008, Sugizaki et al.

U.S. Appl. No. 12/192,169, filed Aug. 15, 2008, Sugizaki et al.

Ikeda, Masataka, et al., "Low Bending Loss Optical Fiber with Reduced Splice Loss." *The Institute of Electronics, Information and Communication Engineers* Aug. 2003: 35-40. (with partial English translation).

* cited by examiner

OPTICAL FIBER, OPTICAL FIBER RIBBON, AND OPTICAL INTERCONNECTION SYSTEM

CROSS-REFERENCE TO RELATED APPLICATIONS

This application is a continuation of PCT international application Ser. No. PCT/JP2007/067056 filed Aug. 31, 2007 which designates the United States, incorporated herein by reference, and which claims the benefit of priority from Japanese Patent Application No. 2006-236203, filed Aug. 31, 2006, incorporated herein by reference.

BACKGROUND OF THE INVENTION

1. Field of the Invention

The present invention relates to an optical fiber for optical wiring in a device, and, more particularly to an optical fiber that can be bent with a small curvature radius, and an optical fiber ribbon and optical interconnection system using the optical fiber.

2. Description of the Related Art

There are two methods for signal transmission in a device, i.e., electrical transmission and optical interconnection. With a recent increase in clock frequency of a CPU, the electric transmission has a problem of crosstalk due to high-density wiring, thereby requiring application of a technique such as waveform shaping. Consequently, it has turned out that when applied as a signal transmission method in a device, the electrical transmission has a transmission limit with a transmission distance of about 1 meter and a transmission rate of about 10 Gbps.

Meanwhile, the optical interconnection allows a broader band transmission than the electrical transmission, and can establish a signal transmission system using optical components that are smaller and consume lower power. Thus, the optical interconnection draws attention as a technique for signal transmission in a device, replacing the electrical transmission.

One optical transmission means using optical fibers according to the optical interconnection attracts attention. It is desirable that all optical components used in a device be accommodated in a small space as much as possible. Therefore, optical fibers that are capable of flexible wiring and produce a reduced splice loss in connection of optical components, such as an optical fiber and an optical fiber, and an optical fiber and an optical source, are desirable to be used in the optical interconnection.

As an optical source, a Vertical-Cavity Surface-Emitting Laser (hereinafter, VCSEL) that operates under direct modulation from 2.5 Gbps to 10 Gbps draws attention as an uncooled source for Ethernet (registered trademark) and fiber channel of an access system. The VCSEL has the following characteristics as compared to an edge emitting laser such as a distributed feedback (DFB) laser.

(a) Laser beams are emitted vertically from a substrate surface.

(b) Multi-channel arraying is easy.

(c) It can operate with a low threshold and low power consumption.

(d) An emitting surface has high reflectance and is resistant to reflected light (isolator free).

(e) Emitted beams have a circular shape and a coupling ratio with fibers is high (lens free).

Because components such as the isolator and the lens can be eliminated, the VCSEL is a device that can reduce costs as a module. A VCSEL at a waveband of 850 nanometers using a GaAs/AlGaAs quantum and the like as an active layer has become increasingly common as a de facto standard of a laser element for a short-range communication. An example of typical optical fibers to be used is a silica graded-index optical fiber, which is one type of multimode fibers (hereinafter, MMF).

The MMF has a core diameter about ten times that of a single mode fiber (hereinafter, SMF), and has a large number of openings. Therefore, the MMF does not require a high accuracy in connecting optical components such as an optical fiber and an optical fiber, and an optical fiber and an optical source, and allows easier connection.

Recently, application of the SMF having a lower loss and a wider band than that of the MMF has begun being discussed to realize a higher-speed transmission. The VCSEL having an oscillation wavelength of 1.3 micrometers (1300±50 nanometers), which is a low loss band of a silica optical fiber, draws attention as an optical source to be used, and is actively studied and developed.

However, a standard SMF defined by ITU-T (International Telecommunication Unit Telecommunication Standard Sector) G.652 cannot address occurrence of a large bending loss when accommodated in a device.

An optical fiber that has a trench refractive index profile in a cladding portion of the standard SMF with a lower index portion than the cladding is reported as an SMF with a reduced bending loss, which is an optical fiber suitably used for FTTH (Fiber To The Home) (for example, in Masataka IKEDA, Shoichiro MATSUO, Kuniharu HIMENO, "Low bending loss optical fiber with reduced splice loss", Technical report of the Institute of Electronics, Information and Communication Engineers, OCS2003-43, OFT2003-25 (2003-8)). However, such an SMF is insufficient for the optical interconnection system.

As described above, realization of an optical fiber that has a reduced bending loss and splice loss, provides high-speed optical transmission, and is suitable for easily establishing an optical interconnection system is demanded to be used for the optical interconnection system.

The standard SMF causes a large bending loss, and is not applicable. Thus, reduction of the bending loss in the optical fiber is required. However, even the SMFs having reduced bending losses, including the optical fiber described in the above literature, which are suitably used for the FTTH are insufficient to be used in the optical interconnection system.

SUMMARY OF THE INVENTION

It is an object of the present invention to at least partially solve the problems in the conventional technology.

According to an aspect of the present invention, an optical fiber is made of silica-based glass, and includes a core and a cladding. The optical fiber has a mode field diameter of 5.4 micrometers or larger at a wavelength of 1300 nanometers, transmits light with a wavelength of 1250 nanometers in a single mode, and has a bending loss of 1 dB/turn or smaller at a wavelength of 1300 nanometers when the optical fiber is bent with a curvature radius of 1 millimeter.

According to another aspect of the present invention, an optical fiber ribbon includes a plurality of optical fibers arranged in parallel and combined in a flat-band shape. Each optical fiber is made of silica-based glass, and includes a core and a cladding. Each optical fiber also has a mode field diameter of 5.4 micrometers or larger at a wavelength of 1300 nanometers, transmits light with a wavelength of 1250 nanometers in a single mode, and has a bending loss of 1 dB/turn or smaller at a wavelength of 1300 nanometers when the optical fiber is bent with a curvature radius of 1 millimeter.

According to still another aspect of the present invention, an optical interconnection system in a communication waveband of 1.3 micrometers includes an optical fiber that is made of silica-based glass and that includes a core and a cladding, and a vertical-cavity surface-emitting laser emitting an optical signal in a waveband of 1.3 micrometers to the optical fiber. The optical fiber has a mode field diameter of 5.4 micrometers or larger at a wavelength of 1300 nanometers, transmits light with a wavelength of 1250 nanometers in a single mode, has a bending loss of 1 dB/turn or smaller at a wavelength of 1300 nanometers when the optical fiber is bent with a curvature radius of 1 millimeter, and transmits an optical signal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an optical fiber according to the present invention will be explained below in detail with reference to the accompanying drawings. Note that the present invention is not limited to the embodiments.

An optical fiber according to the present invention transmits light with a wavelength of 1250 nanometers in a single mode to allow high-speed optical transmission with a low loss in a waveband of 1.3 micrometers. A mode field diameter at a wavelength of 1300 nanometers is 5.4 micrometers or larger. Thus, a splice loss between optical fibers can be reduced, which facilitates establishment of an optical interconnection system. A bending loss at a wavelength of 1300 nanometer when the optical fiber is bent with a curvature radius of 1 millimeter is 1 dB/turn or lower, which allows flexible wiring and compact storage of optical fibers. Specific explanations are given hereinafter.

When a silica optical fiber is used for optical wiring in a device, the optical fiber needs to provide flexible wiring and allow for compact storage. When a high-speed optical interconnection system is to be established, a transmission loss of the optical fiber is preferably next to nil. That is, an optical fiber for optical interconnection is required to have no bending loss even when the optical fiber is bent with a quite small curvature radius at the wiring. In an actual configuration of optical wiring in a device, it is assumed that the arranged optical fiber is finally bent at plural positions with a curvature radius of about 1 millimeter. When a required bending loss tolerance is calculated in view of a local bending at wiring arrangement or a worst case design, an optical fiber that has a bending loss of 1 dB or lower when a bend of one turn with a curvature radius of 1 millimeter is applied has sufficiently satisfactory bending loss characteristics. (In this specification, a term "turn" is used as a unit for counting portions in which a bend is formed (bent portions). A bend at 360 degrees of an optical fiber is referred to as one turn. For example, a case in which there are four bent portions at 90 degrees is referred to as one turn. A case in which there are two bent portions at 90 degrees is referred to as half turn.) In such a case, flexible optical wiring is possible.

Normally, to reduce a bending loss in the standard SMF, an effective refractive index in a basic mode needs to be increased. To increase the effective refractive index in the basic mode, a relative refractive index difference $\Delta$ between a core and a cladding is usually increased in a refractive index profile of an optical fiber. The relative refractive index difference $\Delta$ is defined by the following formula (1), where $n_{core}$ and $n_{clad}$ denote refractive indexes of a core area and a cladding area, respectively.

$$\Delta = \{(n_{core} - n_{clad})/n_{core}\} \times 100 [\%] \quad (1)$$

Figure 1:
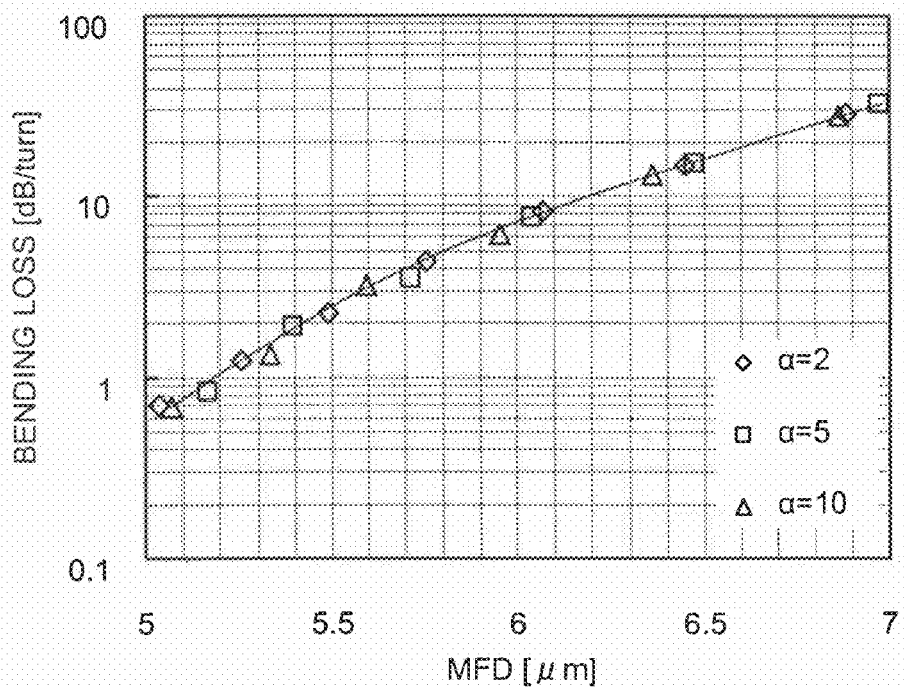
FIG. 1 is a graph of a relation between a bending loss and an MFD in a simple refractive index profile (where a bending radius is set at 1 millimeter, and a cutoff wavelength is at 1300 nanometers)

FIG. 1 depicts a simulated relation between a mode field diameter (hereinafter, MFD) [μm] at a wavelength of 1300 nanometers and a bending loss [dB/turn] of one turn with a bending radius of 1 millimeter at a wavelength of 1300 nanometers, when a relative refractive index difference $\Delta$ of a core, a core diameter, and a parameter $\alpha$ representing a refractive index profile of a core are variously changed in an optical fiber with a simple refractive index profile. A cutoff wavelength is fixed to 1300 nanometers. When a value representing the refractive index profile of a core is $\alpha$, $\alpha$ is defined by the following formula (2).

$$n^2(r) = n_{core}^2 \times \{1 - 2 \times (\Delta/100) \times (2r/a)^\alpha\} \text{(where } 0 < r < a/2\text{)} \quad (2)$$

In this formula, r denotes a radial position from a center of the optical fiber, n(r) denotes a refractive index at a position r, and "a" denotes a core diameter. A symbol "^" denotes a power. Generally, when the relative refractive index difference $\Delta$ in the optical fiber with the simple refractive index profile is increased, the MFD is reduced. FIG. 1 shows that when the MFD is reduced by increasing the relative refractive index difference $\Delta$, the bending loss is reduced. Even when $\alpha$ is changed, the relation between the bending loss and the MFD does not change. That is, the relation between the bending loss and the MFD in the simple refractive index profile is fixed independent of the refractive index profile of a first core. FIG. 1 indicates that the MFD of about 5.2 micrometers or smaller is required to realize a bending loss of 1.0 db/turn or lower. To realize the MFD of this value, the relative refractive index difference $\Delta$ of about 1.3% or larger is required.

When the bending loss is reduced, the MFD is reduced. For example, in the case of a simple refractive index profile with $\Delta=1.3\%$ and $\alpha=2.0$, the bending loss is 0.7 dB/turn, and the MFD is reduced to about 5.0 micrometers.

When a communication system in a device is provided according to the optical interconnection, optical components such as an optical fiber and a VCSEL are assumed to be connected by spatial coupling. Normally, when optical waveguides are connected by spatial coupling, a splice loss is produced. The splice loss T is defined by a coupling efficiency $\eta$, and can be theoretically calculated using the following formulas (3) to (5).

$$T = -10 \times \log \eta \tag{3}$$

$$\eta = \kappa \times \exp\{-\kappa \times [(1/w_1^2 + 1/w_2^2) \times x_0^2/2]\} \tag{4}$$

$$\kappa = 4/\{(w_1/w_2 + w_2/w_1)^2 + ((\lambda \times z/(\pi \times w_1 \times w_2))^2\} \tag{5}$$

In the formulas, $w_1$ and $w_2$ denote MFDs of optical fibers to be connected, $x_0$ denotes an amount of optical axial misalignment between connected fibers (hereinafter, "axial misalignment"), $\lambda$ denotes a wavelength to be used, and z denotes a distance between optical fiber facets. These formulas assume that optical axes of the both fibers are parallel to each other.

Figure 2:
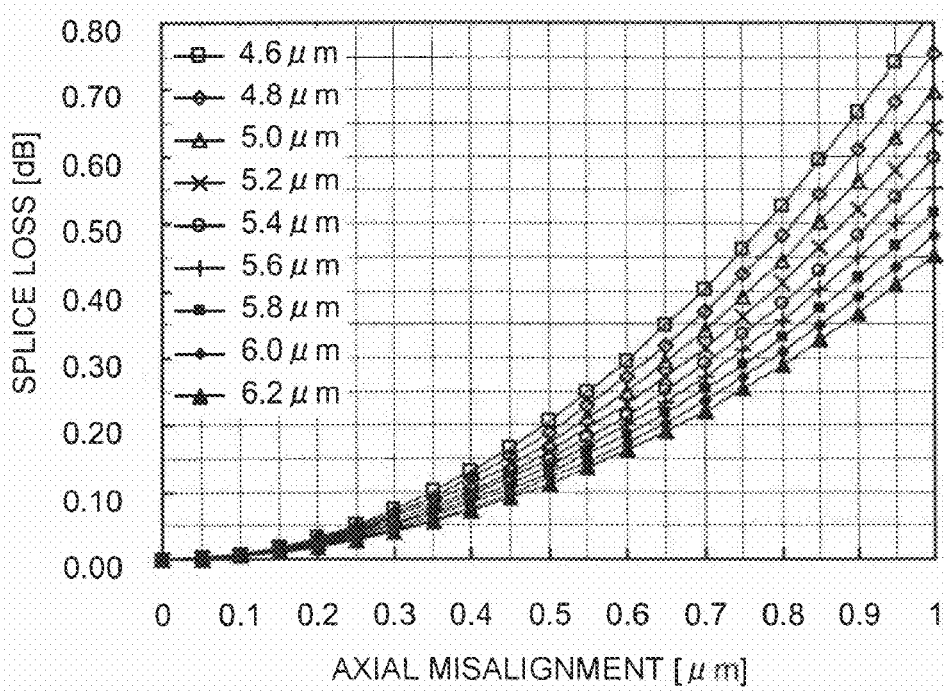
FIG. 2 is a graph of a relation between an amount of axial misalignment and a splice loss in connecting optical fibers of the same kinds with each MFD.

FIG. 2 depicts a relation between an axial misalignment and a splice loss at a wavelength of 1300 nanometers in spatial coupling between the same kinds of optical fibers obtained by the formulas (3) to (5). FIG. 2 is a graph of a relation between an axial misalignment and a splice loss in connecting the same kinds of optical fibers with the MFDs of 4.6 to 6.2 micrometers indicated by legends. The horizontal axis represents an axial misalignment [μm] at the connection of the same kinds of optical fibers. The vertical axis represents a splice loss [dB] at the connection of the same kinds of optical fibers.

The relation shown in FIG. 2 is obtained by setting the distance z between the connected optical fiber facets to zero. FIG. 2 indicates that when the axial misalignment is increased, the splice loss is increased. It is also found that when the MFD of the optical fibers to be connected is smaller, inclination of an increase of the splice loss with respect to the axial misalignment is larger. The axial misalignment and the MFD are important parameters at the connection between an optical fiber and an optical source such as a VCSEL, between an optical fiber and an optical receiver such as a PD, or between optical fibers. The maximum value of the axial misalignment due to existing manufacturing errors can be about 1.0 micrometer. Thus, a loss design that allows for an axial misalignment of 1.0 micrometer is required in view of the worst case design.

For example, establishment of a high-speed optical interconnection system in which a VCSEL and a PD are connected by optical fibers is assumed. An optical output value of the VCSEL is set to about −10 dBm in view of a tendency of the output to be reduced during an operation at high temperatures, and the minimum sensitivity of the PD is set to −16 dBm. In this case, an optical link loss budget of only about 6 dB is assured. A specific optical wiring configuration is now considered. It is assumed that there are one connection between an optical fiber and a VCSEL, five connections between optical fibers, and one connection between an optical fiber and a PD, and that each of the connections has axial misalignment of 1.0 micrometer in view of the worst case design. In the connections between the VCSEL and the optical fiber, and the optical fiber and the PD among the above connections, when the MFDs of the respective components are 4 to 6 micrometers and angular misalignment is 3 degrees, a total splice loss is about 3.0 dB. Thus, an allowable total splice loss between the optical fiber and the optical fiber needs to be 3 dB or smaller, i.e., a splice loss per connection needs to be 0.6 dB or smaller. To satisfy this condition, the MFD needs to be a minimum of 5.4 micrometers as shown in FIG. 2. In the simple refractive index profile of $\Delta=1.3\%$ and $\alpha=2.0$ having the reduced bending loss, the MFD is about 5.0 micrometers. Accordingly, a splice loss of a maximum of 0.70 dB per connection is produced. Therefore, a total splice loss is about 3.5 dB in this case, and a high-speed optical interconnection system is difficult to establish.

As described above, when the relative refractive index difference Δ is increased to reduce a bending loss in designing an optical fiber refractive index profile, the MFD is reduced, which increases a splice loss. That is, the bending loss and the splice loss have a trade-off relation. In the simple refractive index profile, even when the refractive index profile of a first core is changed, the trade-off relation is not improved at all, as shown in FIG. 1.

In the optical fiber according to the present embodiment, a core has a W-shaped refractive index profile with a two-layer structure, or a W-segmented refractive index profile or a quasi W-shaped refractive index profile with a three-layer structure. Structural parameters are optimized to improve the trade-off relation between the bending loss and the splice loss.

Specifically, when a core diameter is changed to define a cutoff wavelength in an SMF having a simple refractive index profile, optical fibers with the same MFD produce the same bending loss hardly depending on the core shape. However, in a W-shaped refractive index profile in which a depressed layer having a lower refractive index than that of a cladding is provided around a first core as a second core, the MFD can be changed while maintaining the same bending loss and cutoff wavelength as those of the simple refractive index profile. When the depressed layer is provided, the cutoff wavelength is not shifted toward a longer wavelength even when the relative refractive index difference (Δ) of the center core is increased. Therefore, there is no need to reduce the core diameter to adjust the cutoff wavelength. When the depressed layer is provided as the second core, the shape of the first core greatly affects the MFD. When α representing the refractive index profile the first core is smaller, an effect of optical confinement is increased, which increases the MFD. The MFD is not so susceptible to the relative refractive index difference Δ and the width of the depressed layer.

An optical wiring configuration in a device requires compact storage. Bends with a small curvature radius having a bending radius of about 5 millimeters due to deflection in wiring and the like can be applied at various positions in the device, in addition to the bends with a bending radius of about 1 millimeter. The positions at which the bends with a bending radius of about 1 millimeter are applied are subjected to heat treatment or the like, to release deformation. However, the bends with a bending radius of about 5 millimeters occurring at various positions in the device are not treated similarly. Therefore, when bends with a small curvature radius are applied at positions at which bends with a bending radius of about 5 millimeters are applied to an optical fiber, there is concern that the optical fiber breaks due to stress and strain produced at the bent portions. Therefore, a failure rate due to bending needs to be reduced.

The bending losses vary according to the bending radii. When the bending radius is enlarged from 1 millimeter to 5 millimeters, the bending loss is reduced by about double digits. Even when an optical fiber with a bending radius of 1 millimeter has a bending loss of 10 dB/turn, the bending loss is improved up to about 0.1 dB/turn when the bending radius is 5 millimeters. Therefore, when the bending loss satisfies a condition of 1 dB/turn at the bending radius of 1 millimeter, variations of the loss are within a range of error even when bends with a radius of about 5 millimeters are applied at wiring of the optical fibers.

Figure 3:
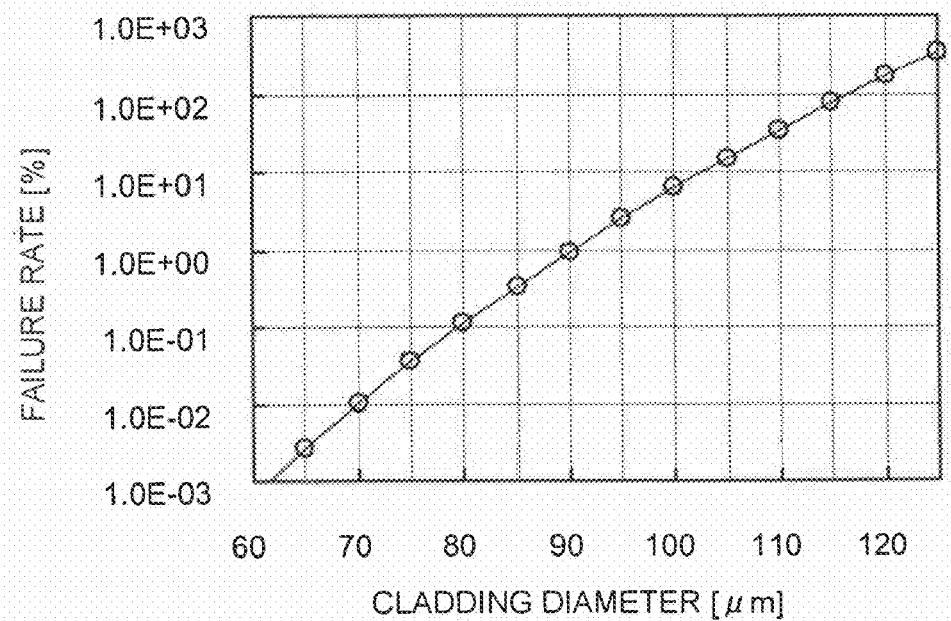
FIG. 3 is a graph of a relation between a failure rate and a cladding diameter in a case in which an optical fiber has a bend of one turn with a bending radius of 5 millimeters and a lifetime of five years.

Usually, when the cladding diameter is larger, a larger deformation is caused in bending an optical fiber, and thus the failure rate becomes larger. For example, when an optical interconnection system using optical fibers is established, it is assumed that the optical fiber has a bend of substantially one turn with a bending radius of about 5 millimeters. FIG. 3 depicts a simulated relation between a cladding diameter and a failure rate of such an optical fiber.

FIG. 3 is a graph of a relation between a failure rate and a cladding diameter in the case of a bend of one turn with a bending radius of 5 millimeters and a lifetime of five years. The vertical axis represents a failure rate [%], and the horizontal axis represents a cladding diameter [μm]. This simulation assumes that a screening level is 1.5%, a fatigue factor for a coating material is 18, and a lifetime of a product is five years. A failure rate of an optical fiber having a cladding diameter of 125 micrometers reaches 100% within five years, and thus system establishment is impossible. When the cladding diameter is reduced to 90 micrometers, the failure rate of the fiber is reduced to 0.9%, which is equivalent to about 0.3% of that in the case of the cladding diameter of 125 micrometers. In view of system designing, the failure rate is preferably 1.0% or lower. Demands for the normal optical fiber to improve the failure rate due to bending in view of occurrence of a bending loss are not so strong. However, when an optical fiber is bent in a small radius like in the optical interconnection, a significant effect is obtained by reducing the failure rate due to bending with a small radius.

In the SMF, it is thought that a cladding area up to about ten times the MFD affects a transmission loss. Thus, in a fiber for this purpose having an MFD of 5.4 micrometers or larger, when a cladding diameter is 55 micrometers or larger, the transmission loss does not increase due to reduction in the cladding diameter.

That is, in the optical fiber according to this embodiment, when the cladding diameter is reduced to 55 to 90 micrometers, the failure rate at application of a bending stress is reduced, and flexibility of wiring is enhanced.

Figure 4:
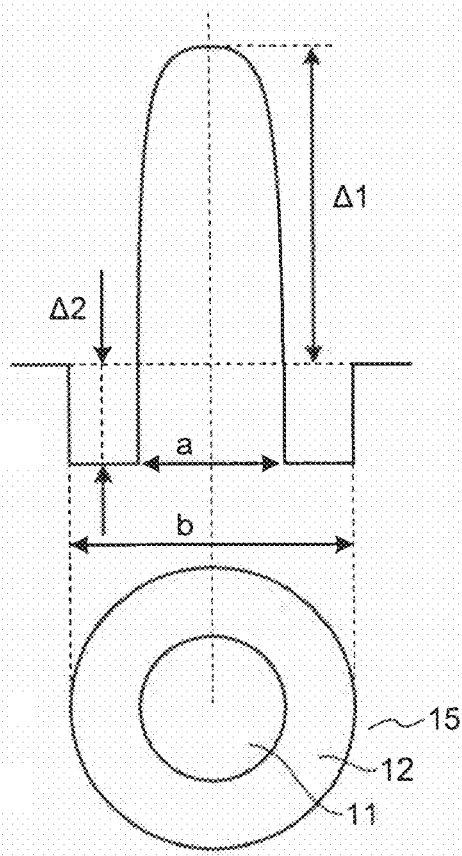
FIG. 4 depicts a W-shaped refractive index profile used in simulation.

The optical fiber according to this embodiment is explained in more detail with reference to a result of simulation. Characteristics of an optical fiber with a cladding diameter of 80 micrometers, which is made of silica-based glass and a W-shaped refractive index profile as shown in FIG. 4 were simulated. The optical fiber having the W-shaped refractive index profile as shown in FIG. 4 has a germanium-doped first core 11 (diameter "a") at a center, and a fluorine-doped second core 12 (diameter b) around the first core 11. A pure-silica cladding 15 is provided around the second core 12.

The following Table 1 shows results of simulations of characteristics of optical fibers having numbers A1 to A15 when parameters vary in the optical fibers having the W-shaped refractive index profile shown in FIG. 4 (MFDs, bending losses, and dispersions are those at a wavelength of 1300 nanometers).

TABLE 1

| No. | Δ1[%] | α1 | Δ2[%] | a[μm] | b[μm] | MFD [μm] | Bending loss [dB/turn] | Dispersion [ps/nm/km] | Cutoff wavelength [nm] |
|---|---|---|---|---|---|---|---|---|---|
| A1 | 0.7 | 8.0 | −0.5 | 7.8 | 13.0 | 6.2 | 1.2 | 1.78 | 1243 |
| A2 | 0.8 | 8.0 | −0.5 | 7.2 | 12.0 | 5.8 | 0.6 | 1.04 | 1238 |
| A3 | 0.9 | 8.0 | −0.5 | 6.7 | 11.2 | 5.5 | 0.3 | 0.25 | 1236 |
| A4 | 0.9 | 1.4 | −0.5 | 9.7 | 19.3 | 6.3 | 1.1 | −2.15 | 1242 |
| A5 | 0.9 | 1.5 | −0.5 | 9.5 | 18.9 | 6.2 | 0.9 | −1.96 | 1243 |
| A6 | 1.2 | 1.5 | −0.1 | 7.5 | 13.6 | 5.4 | 1.1 | −9.21 | 1238 |
| A7 | 1.2 | 1.5 | −0.2 | 7.8 | 14.1 | 5.5 | 0.6 | −7.40 | 1244 |
| A8 | 1.2 | 1.5 | −0.3 | 7.9 | 14.3 | 5.4 | 0.4 | −6.24 | 1238 |
| A9 | 1.2 | 1.5 | −0.4 | 8.0 | 14.5 | 5.4 | 0.3 | −5.27 | 1238 |
| A10 | 1.2 | 1.5 | −0.5 | 8.1 | 14.7 | 5.4 | 0.2 | −4.47 | 1244 |
| A11 | 1.2 | 1.5 | −0.6 | 8.1 | 14.8 | 5.4 | 0.1 | −3.81 | 1242 |
| A12 | 1.1 | 2.0 | −0.4 | 7.7 | 15.4 | 5.5 | 0.3 | −3.50 | 1240 |
| A13 | 0.9 | 6.0 | −0.05 | 5.7 | 17.1 | 5.9 | 0.8 | −5.20 | 1258 |
| A14 | 0.9 | 6.0 | −0.05 | 5.7 | 20.0 | 5.9 | 0.8 | −5.19 | 1255 |
| A15 | 0.9 | 6.0 | −0.05 | 5.7 | 22.8 | 5.9 | 0.8 | −5.18 | 1253 |

The pure silica suggests silica including no dopant for refractive index adjustment, and can include a chlorine element that does not affect the refractive index and the like.

A relative refractive index difference Δ1 and a relative refractive index difference Δ2 are that of the first core 11 with respect to the cladding 15 and that of the second core 12 with respect to the cladding 15, and represented by the following formulas (6) and (7), respectively.

$$\Delta 1 = \{(n_{c1} - n_c)/n_c\} \times 100 [\%] \quad (6)$$

$$\Delta 2 = \{(n_{c2} - n_c)/n_c\} \times 100 [\%] \quad (7)$$

In the formulas, $n_{c1}$ denotes a maximum refractive index of the first core 11, $n_{c2}$ denotes a maximum refractive index of the second core 12, and $n_c$ denotes a refractive index of the cladding 15. A value α of the first core 11 is α1.

In the W-shaped refractive index profile, it is assumed that the diameter "a" of the first core 11 is that at a position with the same refractive index as that of the cladding 15 at a boundary between the first core 11 and the second core 12, and that the diameter b of the second core 12 is that at a position with a relative refractive index difference that is half the relative refractive index difference Δ2 (which is described later) at a boundary between the second core 12 and the cladding 15.

Among optical fibers of the numbers A1 to A15 in FIG. 4, those of the numbers A2, A3, A5, and A7 to A15 have MFDs of 5.4 micrometers or larger at a wavelength of 1300 nanometers, transmit light with a wavelength of 1250 nanometers in a single mode, and have bending losses of 1 dB/turn or smaller when the optical fibers are bent with a radius of 1 millimeter. Therefore, these simulation results indicate that when the relative refractive index difference (Δ1) is 0.8% or larger and α is 1.5 or larger in the first core 11, and the relative refractive index difference (Δ2) of the second core 12 is −0.05% or smaller in the optical fiber having the W-shaped refractive index profile as shown in FIG. 4, such an optical fiber provides desired characteristics according to the present invention. Particularly, only thing to do is that the relative refractive index difference (Δ2) of the second core 12 is set to −0.05% or smaller, i.e., the refractive index of the second core 12 is made slightly lower than that of the cladding 15, and thus the flexibility in designing the refractive index profile is increased, which enhances the productivity.

The cutoff wavelength in this specification assumes a fiber cutoff wavelength λc defined by ITU-T G.650.1. Other terms which are not particularly defined in this specification are based on definitions or measurement methods according to ITU-T G.650.1.

Figure 5:
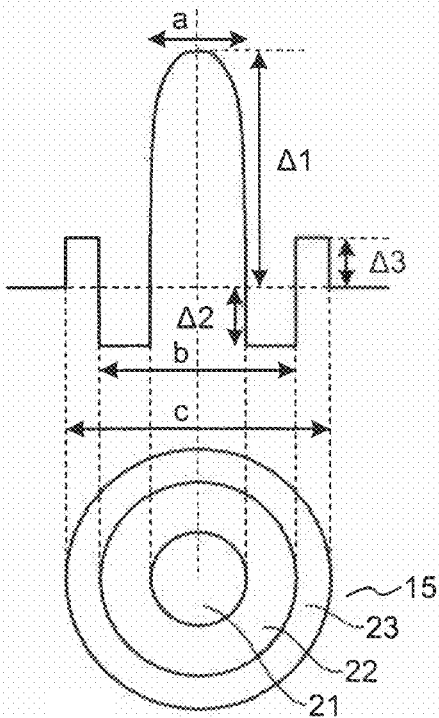
FIG. 5 depicts a W-segmented refractive index profile used in simulation.

Characteristics of an optical fiber made of silica-based glass with a cladding diameter of 80 micrometers, having a W-segmented refractive index profile as shown in FIG. 5 were simulated. The optical fiber having the W-segmented refractive index profile as shown in FIG. 5 includes a germanium-doped first core 21 (diameter "a") at the center. A fluorine-doped second core 22 (diameter b) is provided around the first core 21. A germanium-doped third core 23 (diameter c) is provided around the second core 22. The cladding 15 made of pure silica is provided around the third core 23. A relative refractive index difference Δ3 is that of the third core 23 with respect to the cladding 15, and is represented by the following formula (8).

$$\Delta 3 = \{(n_{c3} - n_c)/n_c\} \times 100 [\%] \quad (8)$$

In this formula, $n_{c3}$ denotes a maximum refractive index of the third core 23 in the W-segmented refractive index profile. In the W-segmented refractive index profile, the diameter "a" of the first core 21 is that at a position with the same refractive index as that of the cladding 15 at a boundary between the first core 21 and the second core 22. The diameter b of the second core 22 is that at a position with a relative refractive index difference that is half the relative refractive index difference Δ2 at a boundary between the second core 22 and the third core 23. The diameter c of the third core 23 is that at a position with a relative refractive index difference that is one-tenth of the relative refractive index difference Δ3 at a boundary between the third core 23 and the cladding 15.

The following Table 2 shows results of simulations of characteristics of optical fibers having numbers B1 to B13 when parameters vary in the optical fibers having the W-segmented refractive index profile shown in Table 1 (MFDs, bending losses, and dispersions are those at a wavelength of 1300 nanometers).

TABLE 2

| No. | Δ1 [%] | α1 | Δ2 [%] | Δ3 [%] | a [μm] | b [μm] | c [μm] | MFD [μm] | Bending loss [dB/turn] | Dispersion [ps/nm/km] | Cutoff wavelength [nm] |
|---|---|---|---|---|---|---|---|---|---|---|---|
| B1 | 0.7 | 6.0 | −0.5 | 0.2 | 8.0 | 14.5 | 18.9 | 6.2 | 1.9 | 1.72 | 1237 |
| B2 | 0.8 | 6.0 | −0.5 | 0.2 | 7.4 | 13.5 | 17.6 | 5.9 | 0.8 | 1.09 | 1241 |
| B3 | 1.1 | 1.4 | −0.3 | 0.2 | 8.3 | 12.7 | 15.2 | 5.7 | 1.1 | −6.23 | 1241 |
| B4 | 1.1 | 1.5 | −0.3 | 0.2 | 8.1 | 12.4 | 14.9 | 5.6 | 0.9 | −6.23 | 1240 |
| B5 | 1.2 | 1.5 | −0.1 | 0.2 | 7.2 | 13.0 | 15.6 | 5.4 | 1.2 | −10.57 | 1243 |
| B6 | 1.2 | 1.5 | −0.2 | 0.2 | 7.6 | 13.8 | 16.6 | 5.4 | 0.6 | −7.88 | 1239 |
| B7 | 1.2 | 1.5 | −0.3 | 0.2 | 7.8 | 14.2 | 19.5 | 5.4 | 0.3 | −6.38 | 1237 |
| B8 | 1.2 | 1.5 | −0.4 | 0.2 | 8.0 | 14.5 | 17.4 | 5.4 | 0.2 | −5.29 | 1241 |
| B9 | 1.0 | 2.5 | −0.4 | 0.3 | 7.6 | 13.8 | 16.6 | 5.6 | 0.5 | −2.5 | 1244 |
| B10 | 1.0 | 2.5 | −0.4 | 0.4 | 7.3 | 13.3 | 16.0 | 5.5 | 0.6 | −3.1 | 1240 |
| B11 | 1.0 | 2.5 | −0.4 | 0.5 | 6.5 | 11.9 | 14.3 | 5.2 | 1.6 | −6.2 | 1245 |
| B12 | 0.8 | 6.0 | −0.05 | 0.1 | 5.7 | 10.4 | 13.6 | 5.6 | 0.9 | −9.2 | 1233 |
| B13 | 1.1 | 2.0 | −0.05 | 0.2 | 6.5 | 10.4 | 11.7 | 5.4 | 0.8 | −11.5 | 1242 |

Among the optical fibers of the numbers B1 to B13 in FIG. 5, those of the numbers B2, B4, and B6 to B13 (except B11) have MFDs of 5.4 micrometers or larger at a wavelength of 1300 nanometers, transmits light of 1250 nanometers in a single mode, and have bending losses of 1 dB/turn or smaller when being bent with a radius of 1 millimeter. Therefore, these simulation results indicate that when the relative refractive index difference (Δ1) is 0.8% or larger and α is 1.5 or larger in the first core 21, the relative refractive index difference (Δ2) of the second core 22 is −0.05% or smaller, and the relative refractive index difference (Δ3) of the third core 23 is 0.4% or smaller in the optical fiber having the W-segmented refractive index profile shown in FIG. 5, such an optical fiber has the desired characteristics.

Figure 6:
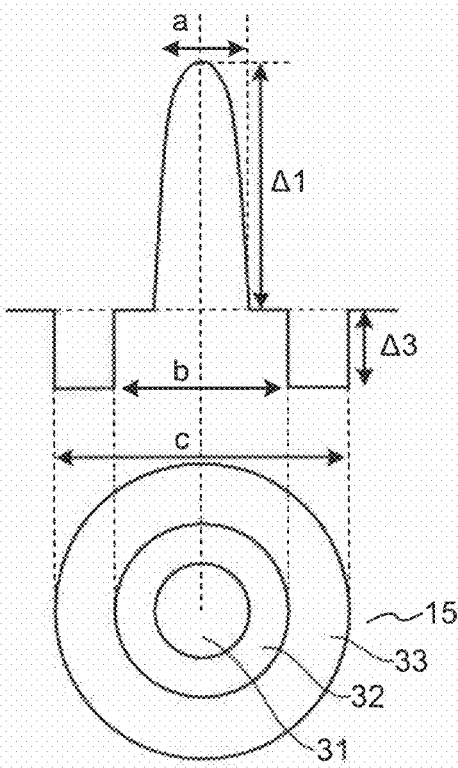
FIG. 6 depicts a quasi W-shaped refractive index profile used in simulation.

Characteristics of an optical fiber made of silica-based glass, having a quasi W-shaped refractive index profile with a cladding diameter of 80 micrometers, as shown in FIG. 6 were simulated. The optical fiber having the quasi W-shaped refractive index profile as shown in FIG. 6 has a germanium-doped first core 31 (diameter "a") at the center. A second core made of pure silica glass (diameter b) is provided around the first core 31. A germanium-doped third core 33 (diameter c) is provided around a second core 32. The cladding 15 is provided around the third core 33. A relative refractive index difference Δ3 is that of the third core 33 with respect to the cladding 15, and is represented by the following formula (9).

$$\Delta 3 = \{(n_{c3} - n_c)/n_c\} \times 100 [\%] \quad (9)$$

In this formula, $n_{c3}$ denotes a minimum refractive index of the third core 33 in the quasi W-shaped refractive index profile. It is assumed that the diameter "a" of the first core 31 is that at a position with a relative refractive index difference that is one-tenth of the relative refractive index difference Δ1 at a boundary between the first core 31 and the second core 32, in the quasi W-shaped refractive index profile. The diameter b of the second core 32 is that at a position with a relative refractive index difference that is half the relative refractive index difference Δ3 at a boundary between the second core 32 and the third core 33. The diameter c of the third core 33 is that at a position with a relative refractive index difference that is half the relative refractive index difference Δ3 at a boundary between the third core 33 and the cladding 15.

The following Table 3 shows results of simulations of characteristics of optical fibers having numbers C1 to C11, when parameters vary in the optical fibers having the quasi W-shaped refractive index profile shown in FIG. 6 (MFDs, bending losses, and dispersions are those at a wavelength of 1300 nanometers).

TABLE 3

| No. | Δ1 [%] | α1 | Δ2 [%] | Δ3 [%] | a [μm] | b [μm] | c [μm] | MFD [μm] | Bending loss [dB/turn] | Dispersion [ps/nm/km] | Cutoff wavelength [nm] |
|---|---|---|---|---|---|---|---|---|---|---|---|
| C1 | 0.7 | 8.0 | 0.0 | −0.5 | 7.4 | 8.2 | 10.7 | 6.2 | 2.0 | −0.35 | 1236 |
| C2 | 0.8 | 8.0 | 0.0 | −0.5 | 6.8 | 7.6 | 9.9 | 5.9 | 0.9 | −1.32 | 1236 |
| C3 | 0.9 | 8.0 | 0.0 | −0.5 | 6.4 | 7.1 | 9.2 | 5.5 | 0.4 | −2.35 | 1234 |
| C4 | 1.0 | 1.4 | 0.0 | −0.5 | 8.6 | 10.8 | 14.0 | 6.0 | 1.1 | −5.49 | 1240 |
| C5 | 1.0 | 1.5 | 0.0 | −0.5 | 8.5 | 10.6 | 13.8 | 6.0 | 0.9 | −5.32 | 1244 |
| C6 | 1.2 | 1.5 | 0.0 | −0.1 | 7.3 | 8.6 | 11.2 | 5.5 | 1.3 | −10.34 | 1245 |
| C7 | 1.2 | 1.5 | 0.0 | −0.2 | 7.5 | 8.8 | 11.4 | 5.5 | 0.8 | −9.11 | 1246 |
| C8 | 1.2 | 1.5 | 0.0 | −0.3 | 7.6 | 8.9 | 11.6 | 5.5 | 0.5 | −8.26 | 1240 |
| C9 | 1.2 | 1.5 | 0.0 | −0.4 | 7.7 | 9.0 | 11.7 | 5.5 | 0.4 | −7.51 | 1239 |
| C10 | 1.0 | 4.0 | 0.0 | −0.05 | 5.9 | 9.9 | 12.9 | 5.4 | 0.7 | −8.66 | 1246 |
| C11 | 0.9 | 4.0 | 0.0 | −0.05 | 6.3 | 9.0 | 12.6 | 5.7 | 1.0 | −7.07 | 1247 |

Among the optical fibers of the numbers C1 to C11 in Table 3, those of the numbers C2, C3 C5, and C7 to C11 have MFDs of 5.4 micrometers or larger at a wavelength of 1300 nanometers, transmit light of 1250 nanometers in a single mode, and have bending losses of 1 dB/turn when being bent with a radius of 1 millimeter. Therefore, the simulation results show that when the relative refractive index difference (Δ1) is 0.8% or larger and α is 1.5 or larger in the first core 31, the relative refractive index difference (Δ2) of the second core 32 is 0%, and the relative refractive index difference (Δ3) of the third core 33 is −0.05% or smaller in the core refractive index profile of the optical fiber having the quasi W-shaped refractive index profile as shown in FIG. 6, such an optical fiber provides the desired characteristics according to the present invention.

To compare optical characteristics between an optical fiber having a simple refractive index profile and the optical fibers above mentioned, optical characteristics of a simple refractive index profile that is designed to reduce the bending loss were simulated.

The following Table 4 shows results of the simulation of the optical characteristics of an optical fiber having a simple refractive index profile used in simulation for comparison (MFDs, bending losses, and dispersions are those at a wavelength of 1300 nanometers, and a bending radius at the bending losses is 1 millimeter).

TABLE 4

| No. | Δ1[%] | α1 | a[μm] | MFD [μm] | Bending loss [dB/turn] | Dispersion [ps/nm/km] | Cutoff wavelength [nm] |
|---|---|---|---|---|---|---|---|
| D1 | 1.3 | 2.0 | 6.2 | 5.0 | 0.7 | −13.33 | 1232 |
| D2 | 1.1 | 2.0 | 6.8 | 5.5 | 2.3 | −10.68 | 1243 |

In an optical fiber having a number D1, the bending loss is sufficiently reduced to 0.7 dB, while the MFD has a small value of 5.0 micrometers. In an optical fiber having a number D2, the MFD is 5.5 micrometers, while the bending loss is 2.3 dB/turn and the bending loss characteristics are deteriorated. From a result of characteristic comparison between these results and an optical fiber with the number A12 in Table 1 (the MFD is 5.5 micrometers and the bending loss is 0.3 dB/turn), having the W-shaped refractive index profile shown in FIG. 4, it was found that the optical fiber having the W-shaped refractive index profile as shown in FIG. 4 provided optical characteristics that could not be provided by the optical fiber with a simple refractive index profile.

An optical fiber ribbon and an optical interconnection system according to the present embodiment are explained. When an optical fiber is used for the optical interconnection, it is assumed that the optical fiber is formed into a ribbon to provide a multi-channel optical transmitter, thereby realizing high-speed optical communication. Usually, according to specifications of a silica optical fiber, when a cladding diameter is 125 micrometers, an outer diameter of a coated fiber is 250 micrometers, and an optical fiber ribbon that is made by arranging plural optical fibers in parallel and bonding these optical fibers has a pitch of 250 micrometers. In a small-diameter optical fiber having a smaller outer diameter, the outer diameter of a coated fiber is also smaller. Thus, an optical fiber ribbon with a smaller pitch than that of the traditional optical fiber ribbon can be made. Therefore, it is preferable that the small-diameter optical fiber with the cladding diameter of 55 to 90 micrometers as above mentioned be employed. The optical fiber ribbon with a smaller pitch using the small-diameter optical fibers has a higher flexibility in wiring and allows compact storage, and therefore is an optical component suitable for the optical interconnection.

Figure 7:
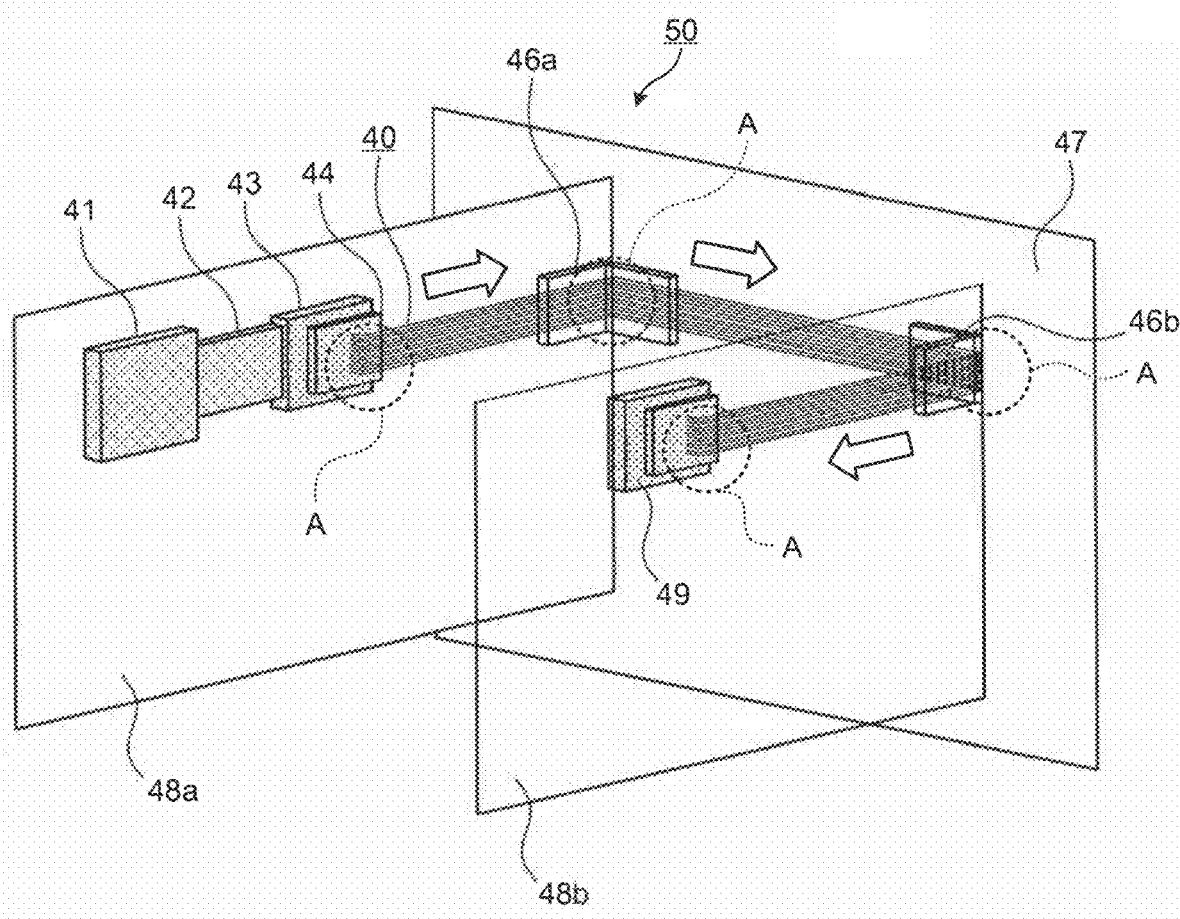
FIG. 7 is a perspective view of a configuration example of an optical interconnection system with a communication waveband of 1.3 micrometers according to an embodiment of the present invention.

As shown by the simulation results above mentioned, the optical fiber according to the present invention provides single-mode optical propagation in a band of 1.3 micrometers, and has satisfactory bending loss and splice loss properties in the band of 1.3 micrometers. FIG. 7 depicts a configuration of an optical interconnection system 50 that applies the optical fiber according to the present invention as a transmission medium, and uses a VCSEL with an oscillation waveband of 1.3 micrometers as an optical source.

In FIG. 7, two printed circuit boards 48a and 48b are vertically arranged with a side of each board being supported by a face of a backplane 47. The two printed circuit boards 48a and 48b face each other, being spaced a predetermined distance. A VCSEL 44 mounted on a driver IC 43 and an LSI 41 are provided on an opposing surface of the printed circuit board 48a. The LSI 41 and the VCSEL 44 are electrically connected by an electric line 42. A PD 49 is provided on an opposing surface of the printed circuit board 48b. The VCSEL 44 and the PD 49 are optically connected by an optical fiber ribbon 40 that are made by combining a plurality of the optical fibers according to the present invention in a form of a flat belt. The optical fiber ribbon 40 extends along the principal surface of the printed circuit board 48a, is bent at an approximately right angle by a first connector 46a, extends on the backplane 47, is bent at an approximately right angle by a second connector 46b, and extends along the principal surface of the printed circuit board 48b, leading to the PD 49.

Figure 8:
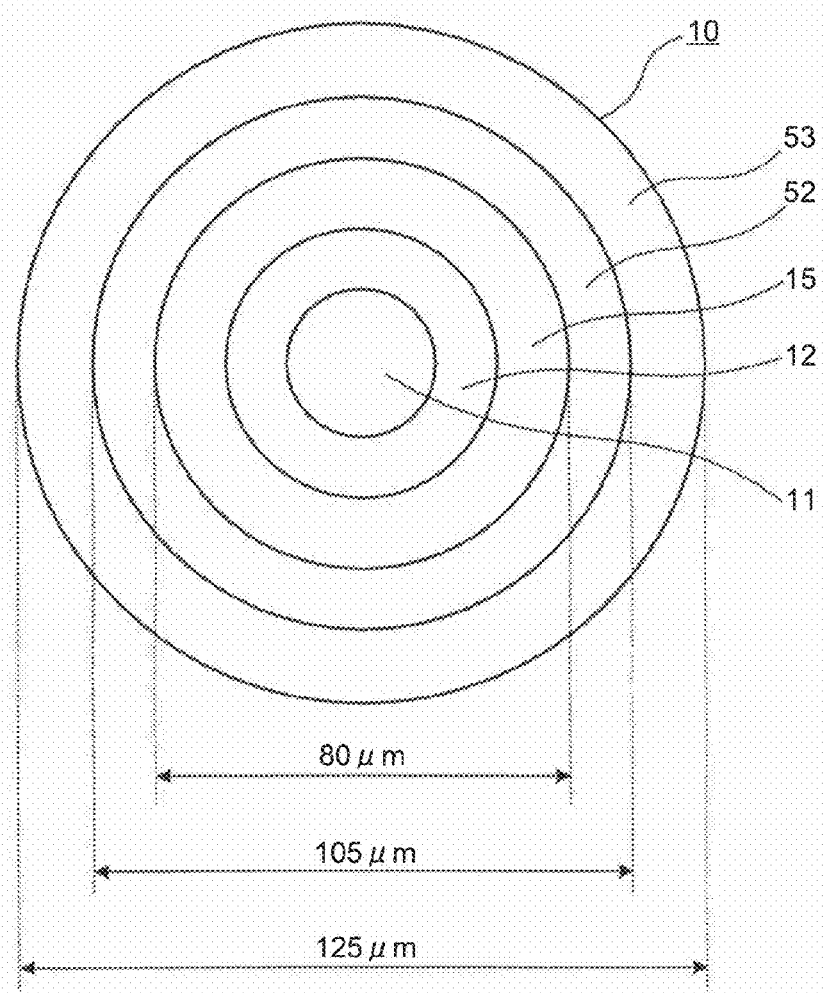
FIG. 8 is a cross section of an optical fiber with a small diameter used in the configuration example of an optical interconnection system shown in FIG. 7.
Figure 9:
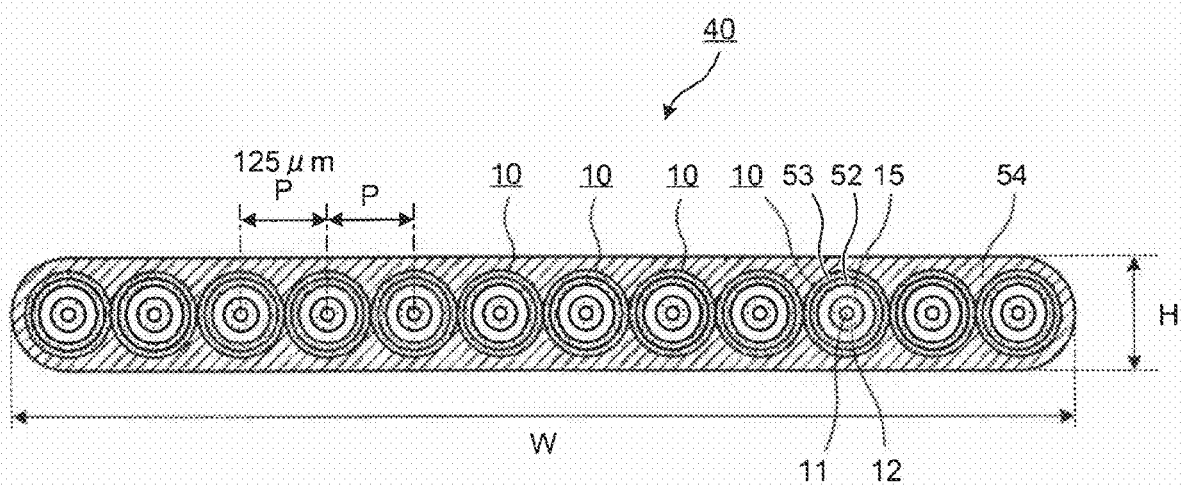
FIG. 9 is a cross section of an optical fiber ribbon with 12 cores and a small diameter used in the configuration example of an optical interconnection system shown FIG. 7.

Such an arrangement of optical fibers applies four bends A each having a ¼ turn with a curvature radius of about 1 millimeter, to the optical fiber ribbon 40. About one turn of a bend with a bending radius of about 5 millimeters is generated by deflection of the optical fibers (not shown) or the like, however, such a bend causes no problem in the operation. As shown in FIG. 8, an optical fiber 10 that has the W-shaped refractive index profile as shown in FIG. 4, and the cladding 15 having a diameter of 80 micrometers, a first coating resin 52 having an outer diameter of 105 micrometers, a second coating resin 53 having an outer diameter of 125 micrometers, and that has parameter values of those of the number A3 in Table 1 is used for the optical fiber ribbon 40. As shown in FIG. 9, the optical fiber ribbon 40 is formed by arranging twelve optical fibers 10 in parallel with a pitch P of 125 micrometers, and coating the optical fibers 10 with a ribbon coating resin 54, to bond these optical fibers 10.

In the optical fiber ribbon 40, a coated diameter H (thickness H) is set to 170 micrometers, considering both an increase in the loss due to thinning of the coating resins 52 and 53, and reduction of spaces. The optical fiber ribbon 40 with the pitch P of 125 micrometers is half the size of the traditional optical fiber ribbon. Thus, the optical fiber ribbon 40 has a considerably high flexibility, and allows a space-saving storage in a device. An ultraviolet (UV) curable resin is employed for materials of the coating resins 52 and 53.

When a small-diameter optical fiber that has the cladding 15 having a diameter of 55 micrometers, and a difference of 20 micrometers between the coated outer diameter and the outer diameter of the cladding is used as the optical fiber 10, the pitch P can be reduced to 75 micrometers.

The finished optical fiber ribbon 40 is 1.55 millimeters in the width W and 0.17 millimeter in the thickness H. When the VCSEL as an optical source to be connected is formed into an array with a pitch of 125 micrometers and 12 channels, a collective optical connection with the finished optical fiber ribbon 40 is provided. With this configuration, when the VCSEL is directly modulated, an ultrahigh-speed optical communication beyond 100 Gbps is realized.

Because the cladding diameter is 80 micrometers, the failure rate due to bending can be reduced. Thus, the optical fiber hardly breaks even after a lapse of five years which is a lifetime of the product.

A flame-resistant fiber ribbon was produced by using a flame-resistant UV-curable urethane acrylate resin as a UV-curable resin, which is a material of the coating resins 52 and 53 in the optical fiber ribbon 40. In producing the flame-resistant UV-curable urethane acrylate resin, a halogenated additive such as bromine and chlorine, an antimony compound such as antimony trioxide and triphenyl antimony, a metallic hydrate such as aluminum hydroxide and magnesium hydroxide, or a phosphorous compound such as phosphate ester was added to the resin, or a prepolymer or acrylic monomer itself that is included in the UV-curable resin was halogenated by bromine or chlorine and phosphorus was further added, to examine a flame resistance of the UV-curable resin. Among these methods, a method of adding a bromine-based flame resistant was particularly effective to obtain the flame resistance.

Reasons why such a change in the composition provides the flame resistance are thought that a reactive product of decomposition covers the surface of the resin, or a cracked gas generated in burning forms a shielding layer between the resin and the air. It is also considered that because a radical produced from a halogen-containing compound prevents continuation of burning or the resin becomes three-dimensional due to cross-linkage.

An optical fiber ribbon obtained by using as the ribbon coating resin, the UV-curable urethane acrylate including the aluminum hydroxide as a flame resistant was evaluated by a 60-degree inclination flame test according to JIS C3005. As a result, a flame that caught the fiber burned out spontaneously in an average of about 3.2 seconds, which satisfies the standards. The flame-resistant ultraviolet curable resin was used in this case, while a flame-resistant thermoplastic resin or a flame-resistant heat curable resin can be used instead of the flame-resistant ultraviolet curable resin.

A higher flame resistance was examined that is obtained by replacing all or part of the coating resins 52 and 53 in the optical fiber ribbon 40, and the ribbon coating resin 54, with a flame-resistant ultraviolet curable resin. In the 60-degree inclination flame test according to JIS C3005, a flame that caught an optical fiber ribbon that is obtained by using at least a ultraviolet curable urethane acrylate resin including a flame resistant for the second coating resin 53 of the optical fiber and the resin for ribbon burned out spontaneously in an average of about 2.6 seconds, which satisfies the standards.

A vertical flame test according to UL-1581 standard was conducted to the optical fiber ribbon above mentioned. As a result, a flame burned out spontaneously in an average of 5.7 seconds. There was no drop burning, and the UL standard was satisfied. When the same vertical flame test was conducted to an optical fiber in a state of wire, to which up to the second coating was applied, a flame burned out spontaneously in an average of 7.6 seconds. Thus, sufficient frame resistances were obtained both in the states of wire and ribbon. The flame-resistant ultraviolet curable resin was used in this case, while a flame-resistant thermoplastic resin or a flame-resistant heat curable resin can be used instead of the flame-resistant ultraviolet curable resin.

According to the present invention, an optical fiber and an optical fiber ribbon having a reduced bending loss and a reduced splice loss and allowing high-speed optical transmission are obtained, thereby easily establishing an optical interconnection system.

Further effect and modifications can be readily derived by persons skilled in the art. Therefore, a more extensive mode of the present invention is not limited by the specific details and the representative embodiment. Accordingly, various changes are possible without departing from the spirit or the scope of the general concept of the present invention defined by the attached claims and the equivalent.

What is claimed is:

1. An optical fiber, made of silica-based glass, comprising:
a core; and
a cladding,
wherein the optical fiber includes a mode field diameter of 5.4 micrometers or larger at a wavelength of 1300 nanometers, the optical fiber is configured to transmit light with a wavelength of 1250 nanometers in a single mode, and the optical fiber includes a bending loss of 1 dB/turn or smaller at a wavelength of 1300 nanometers when the optical fiber is bent with a curvature radius of 1 millimeter, and
wherein the optical fiber includes a relative refractive index difference of a first core of 0.8% or larger with respect to the cladding, the first core being located at a center of the optical fiber, a parameter α of 1.5 or larger, and a relative refractive index difference of a second core of −0.05% or smaller with respect to the cladding, the second core surrounding the first core.

2. The optical fiber according to claim 1, wherein the cladding has a diameter of 55 to 90 micrometers.

3. The optical fiber according to claim 1, further comprising a coating containing at least one of an ultraviolet curable resin, a thermoplastic resin, and a heat curable resin, wherein the coating has a flame resistance.

4. An optical fiber, made of silica-based glass, comprising:
a core; and
a cladding,
wherein the optical fiber includes a mode field diameter of 5.4 micrometers or larger at a wavelength of 1300 nanometers, the optical fiber is configured to transmit light with a wavelength of 1250 nanometers in a single mode, and the optical fiber includes a bending loss of 1 dB/turn or smaller at a wavelength of 1300 nanometers when the optical fiber is bent with a curvature radius of 1 millimeter, and
wherein the optical fiber includes a relative refractive index difference of a first core of 0.8% or larger with respect to the cladding, the first core being located at a center of the optical fiber, a parameter α of 1.5 or larger, a relative refractive index difference of a second core of −0.05% or smaller with respect to the cladding, the second core surrounding the first core, and a relative refractive index difference of a third core of 0.4% or smaller with respect to the cladding, the third core surrounding the second core.

5. The optical fiber according to claim 4, wherein the cladding has a diameter of 55 to 90 micrometers.

6. The optical fiber according to claim 4, further comprising a coating containing at least one of an ultraviolet curable resin, a thermoplastic resin, and a heat curable resin, wherein the coating has a flame resistance.

7. An optical fiber, made of silica-based glass, comprising:
a core; and
a cladding,
wherein the optical fiber includes a mode field diameter of 5.4 micrometers or larger at a wavelength of 1300 nanometers, the optical fiber is configured to transmit light with a wavelength of 1250 nanometers in a single mode, and the optical fiber includes a bending loss of 1 dB/turn or smaller at a wavelength of 1300 nanometers when the optical fiber is bent with a curvature radius of 1 millimeter, and
wherein the optical fiber includes a relative refractive index difference of a first core of 0.8% or larger with respect to the cladding, the first core being located at a center of the optical fiber, a parameter α of 1.5 or larger, a relative refractive index difference of a second core of 0% with respect to the cladding, the second core surrounding the first core, and a relative refractive index difference of a third core of −0.05% or larger with respect to the cladding, the third core surrounding the second core.

8. The optical fiber according to claim 7, wherein the cladding has a diameter of 55 to 90 micrometers.

9. The optical fiber according to claim 7, further comprising a coating containing at least one of an ultraviolet curable resin, a thermoplastic resin, and a heat curable resin, wherein the coating has a flame resistance.

10. An optical fiber ribbon comprising:
a plurality of optical fibers arranged in parallel and combined in a flat-band shape, each optical fiber being made of silica-based glass, and including a core and a cladding, each optical fiber including a mode field diameter of 5.4 micrometers or larger at a wavelength of 1300 nanometers, being configured to transmit light with a wavelength of 1250 nanometers in a single mode, including a bending loss of 1 dB/turn or smaller at a wavelength of 1300 nanometers when the optical fiber is bent with a curvature radius of 1 millimeter, including a relative refractive index difference of a first core of 0.8% or larger with respect to the cladding, the first core being located at a center of the optical fiber, a parameter α of 1.5 or larger, and a relative refractive index difference of a second core of −0.05% or smaller with respect to the cladding, the second core surrounding the first core.

11. The optical fiber ribbon according to claim 10, wherein the plural optical fibers that are combined in a flat-band shape include a ribbon coating containing at least one of a flame-resistant ultraviolet curable resin, a flame-resistant thermoplastic resin, and a flame-resistant heat curable resin.

12. An optical interconnection system in a communication waveband of 1.3 micrometers, comprising:
an optical fiber, made of silica-based glass, including a core and a cladding, the optical fiber including a mode field diameter of 5.4 micrometers or larger at a wavelength of 1300 nanometers, being configured to transmit light with a wavelength of 1250 nanometers in a single mode, including a bending loss of 1 dB/turn or smaller at a wavelength of 1300 nanometers when the optical fiber is bent with a curvature radius of 1 millimeter, including a relative refractive index difference of a first core of 0.8% or larger with respect to the cladding, the first core being located at a center of the optical fiber, a parameter α of 1.5 or larger, including a relative refractive index difference of a second cord of −0.05% or smaller with respect to the cladding, the second core surrounding the first core, and being configured to transmit an optical signal; and
a vertical-cavity surface-emitting laser emitting an optical signal in a waveband of 1.3 micrometers to the optical fiber.

13. An optical fiber ribbon comprising:
a plurality of optical fibers arranged in parallel and combined in a flat-band shape, each optical fiber being made of silica-based glass, and including a core and a cladding, each optical fiber including a mode field diameter of 5.4 micrometers or larger at a wavelength of 1300 nanometers, being configured to transmit light with a wavelength of 1250 nanometers in a single mode, including a bending loss of 1 dB/turn or smaller at a wavelength of 1300 nanometers when the optical fiber is bent with a curvature radius of 1 millimeter, and including a relative refractive index difference of a first core of 0.8% or larger with respect to the cladding, the first core being located at a center of the optical fiber, a parameter α of 1.5 or larger, a relative refractive index difference of a second core of −0.05% or smaller with respect to the cladding, the second core surrounding the first core, and a relative refractive index difference of a third core of 0.4% or smaller with respect to the cladding, the third core surrounding the second core.

14. The optical fiber ribbon according to claim 13, wherein the plural optical fibers that are combined in a flat-band shape include a ribbon coating containing at least one of a flame-resistant ultraviolet curable resin, a flame-resistant thermoplastic resin, and a flame-resistant heat curable resin.

15. An optical fiber ribbon comprising:
a plurality of optical fibers arranged in parallel and combined in a flat-band shape, each optical fiber being made of silica-based glass, and including a core and a cladding, each optical fiber including a mode field diameter of 5.4 micrometers or larger at a wavelength of 1300 nanometers, being configured to transmit light with a wavelength of 1250 nanometers in a single mode, including a bending loss of 1 dB/turn or smaller at a wavelength of 1300 nanometers when the optical fiber is bent with a curvature radius of 1 millimeter, and including a relative refractive index difference of a first core of 0.8% or larger, with respect to the cladding, the first core being located at a center of the optical fiber, a parameter α of 1.5 or larger, a relative refractive index difference of a second core of 0% with respect to the cladding, the second core surrounding the first core, and a relative refractive index difference of a third of −0.05% or larger with respect to the cladding, the third core surrounding the second core.

16. The optical fiber ribbon according to claim 15, wherein the plural optical fibers that are combined in a flat-band shape include a ribbon coating containing at least one of a flame-resistant ultraviolet curable resin, a flame-resistant thermoplastic resin, and a flame-resistant heat curable resin.

17. An optical interconnection system in a communication waveband of 1.3 micrometers, comprising:

an optical fiber, made of silica-based glass, including a core and a cladding, the optical fiber including a mode field diameter of 5.4 micrometers or larger at a wavelength of 1300 nanometers, being configured to transmit light with a wavelength of 1250 nanometers in a single mode, including a bending loss of 1 dB/turn or smaller at a wavelength of 1300 nanometers when the optical fiber is bent with a curvature radius of 1 millimeter, including a relative refractive index difference of a first core of 0.8% or larger with respect to the cladding, the first core being located at a center of the optical fiber, a parameter α of 1.5 or larger, a relative refractive index difference of a second core of −0.05% or smaller with respect to the cladding, the second core surrounding the first core, and a relative refractive index difference of a third core of 0.4% or smaller with respect to the cladding, the third core surrounding the second core, and being configured to transmit an optical; and a vertical-cavity surface-emitting laser emitting an optical signal in a waveband of 1.3 micrometers to the optical fiber.

18. An optical interconnection system in a communication waveband of 1.3 micrometers, comprising:

an optical fiber, made of silica-based glass, including a core and a cladding, the optical fiber including a mode of field diameter of 5.4 micrometers or larger at a wavelength of 1300 nanometers, being configured to transmit light with a wavelength of 1250 nanometers in a single mode, including a bending loss of 1 dB/turn or smaller at a wavelength of 1300 nanometers when the optical fiber is bent with a curvature radius of 1 millimeter, including a relative refractive index difference of a first core of 0.8% or larger with respect to the cladding, the first core being located at a center of the optical fiber, a parameter α of 1.5 or larger, a relative refractive index difference of a second core of 0% with respect to the cladding, the second core surrounding the first core, and a relative refractive index difference of a third core of −0.05% or larger with respect to the cladding, the third core surrounding the second core, and being configured to transmit an optical signal; and a vertical-cavity surface-emitting laser emitting an optical signal in a waveband of 1.3 micrometers to the optical fiber.

* * * * *